US009830759B2

(12) United States Patent
Hilton et al.

(10) Patent No.: US 9,830,759 B2
(45) Date of Patent: Nov. 28, 2017

(54) MODULAR BIKE LOCK (71) Applicant: Cubic Corporation, San Diego, CA (US)

(72) Inventors: Michael Hilton, San Diego, CA (US); Robert Bertino, San Diego, CA (US); Wendy Vasquez, Los Angeles, CA (US)

(73) Assignee: Cubic Corporation San Diego, San Diego, CA (US)

(*) Notice: Subject to any disclaimer, the term of this patent is extended or adjusted under 35 U.S.C. 154(b) by 0 days.

(21) Appl. No.: 15/257,391

(22) Filed: Sep. 6, 2016

(65) Prior Publication Data
US 2017/0069154 A1 Mar. 9, 2017

Related U.S. Application Data (60) Provisional application No. 62/214,851, filed on Sep. 4, 2015.

(51) Int. Cl.
G07C 9/00 (2006.01)
E05B 71/00 (2006.01)
(Continued)

(52) U.S. Cl.
CPC ........... *G07C 9/00182* (2013.01); *B62H 3/00* (2013.01); *B62H 5/20* (2013.01); *E05B 47/0012* (2013.01);
(Continued)

(58) Field of Classification Search
CPC ...... G07C 9/00309; G07C 2009/00769; G07C 9/00111; G07C 9/00007; G07C 9/00571; G07C 2009/00793; G07C 2209/63
(Continued)

(56) References Cited

U.S. PATENT DOCUMENTS

2010/0313614 A1 12/2010 Rzepecki
2014/0109631 A1* 4/2014 Asquith ............... E05B 45/005
70/15
(Continued)

FOREIGN PATENT DOCUMENTS

JP 2003-091751 A 3/2003
KR 2013-0128970 A 11/2013

OTHER PUBLICATIONS

International Search Report and Written Opinion dated Nov. 21, 2016 for International Patent Application No. PCT/US2016/050407, filed Sep. 6, 2016; all pages.

*Primary Examiner* — Mark Blouin
(74) *Attorney, Agent, or Firm* — Kilpatrick Townsend and Stockton, LLP (57) ABSTRACT A modular bike lock includes a locking mechanism and a securement mechanism coupled with the locking mechanism. The securement mechanism wraps around at least a portion of a bicycle and includes a locking end configured to engage with the locking mechanism to lock the bike lock. The bike lock includes a wireless communications interface and a processor that receives, using the interface, a selection from a mobile device that indicates that the mobile device has selected to use the bike lock and communicates, using the interface, a unique identifier associated with the bike lock to the mobile device, the unique identifier enabling the mobile device to unlock the bike lock. The bike lock locks automatically in response to receiving the locking end within a portion of the locking mechanism without receiving an additional input from the mobile device. The bike lock is mountable on a support structure.

18 Claims, 8 Drawing Sheets (51) Int. Cl.

| | | |
|---|---|---|
| *E05B 73/00* | (2006.01) | |
| *E05B 47/00* | (2006.01) | |
| *B62H 5/20* | (2006.01) | |
| *G06Q 20/32* | (2012.01) | |
| *G06Q 20/34* | (2012.01) | |
| *B62H 3/00* | (2006.01) | |
| *G07F 17/24* | (2006.01) | |

(52) U.S. Cl.
CPC .......... *E05B 71/00* (2013.01); *E05B 73/0005* (2013.01); *G06Q 20/3278* (2013.01); *G06Q 20/34* (2013.01); *G07F 17/244* (2013.01); *B62H 2003/005* (2013.01); *E05B 2047/0048* (2013.01); *E05B 2047/0058* (2013.01); *E05B 2047/0064* (2013.01); *E05B 2047/0095* (2013.01); *G07C 2009/00793* (2013.01)

(58) Field of Classification Search
USPC ........................................................ 340/5.61
See application file for complete search history.

(56) References Cited

U.S. PATENT DOCUMENTS

| | | | |
|---|---|---|---|
| 2015/0007619 A1* | 1/2015 | Finney | G07F 17/10 |
| | | | 70/58 |
| 2015/0074004 A1 | 3/2015 | Song | |
| 2016/0217637 A1* | 7/2016 | Gengler | G07C 9/00174 |
| 2016/0243996 A1* | 8/2016 | Anton | B60R 9/06 |
| 2016/0350990 A1* | 12/2016 | Lin | G07C 9/00182 |

\* cited by examiner

MODULAR BIKE LOCK

CROSS-REFERENCES TO RELATED APPLICATIONS

This Application claims priority to U.S. Provisional Patent Application No. 62/214,851 filed Sep. 4, 2015, entitled "MODULAR BIKE LOCK," the entire disclosure of which is hereby incorporated by reference, for all purposes, as if fully set forth herein.

BACKGROUND OF THE INVENTION

Typically, users must carry their own bike locks with them when planning on leaving their bike in a public location. Oftentimes, these locks can be large and/or heavy, and may not be easily carried while riding the bike to and from a destination. Additionally, such locks require the use of a key and/or a combination that must be remembered. Solutions for securing bikes using conventional methods are desired.

BRIEF SUMMARY OF THE INVENTION

Embodiments of the present inventions provide bike commuters the ability to secure their bikes without having to carry a bike lock with them. The bike locks provided herein are compact electromechanical devices that may be locked in a purely mechanical fashion, while being unlocked via an electronic command received a wireless communication protocol, such as Wi-Fi, Bluetooth® or near field communication (NFC), and/or other radio frequency (RF) or wireless protocol, via a mobile device. The bike lock may then be connected with a wireless communications hub, which may connect to a larger network, such as the Internet. Such a configuration allows a user to control lock/unless access of the bike lock remotely using the mobile device.

In one aspect, a modular bike lock is provided. The modular bike lock may include a locking mechanism, a securement mechanism coupled with the locking mechanism, a wireless communications interface, and a processor. The securement mechanism may be configured to wrap around at least a portion of a bicycle. The securement mechanism may include a locking end configured to engage with the locking mechanism to lock the modular bike lock. The processor may be configured to receive, using the wireless communications interface, a selection from a mobile device that indicates that a user of the mobile device has selected to use the modular bike lock and to communicate, using the wireless communications interface, a unique identifier associated with the modular bike lock to the mobile device. The unique identifier may enable the mobile device to unlock the modular bike lock. The modular bike lock may be configured to lock automatically in response to receiving the locking end within a portion of the locking mechanism without receiving an additional input from the mobile device. The modular bike lock may be mountable on a support structure.

In another aspect, a system for locking bikes is provided. The system may include a server, a wireless communications hub, and a plurality of modular bike locks. Each of the plurality of modular bike locks may include a locking mechanism, a securement mechanism coupled with the locking mechanism, a wireless communications interface, and a processor. The securement mechanism may be configured to wrap around at least a portion of a bicycle. The securement mechanism may include a locking end configured to engage with the locking mechanism to lock the modular bike lock. Each modular bike lock may be configured to receive, using the wireless communications interface, a selection from a mobile device that indicates that a user of the mobile device has selected to use the modular bike lock, receive, using the wireless communications interface, a mobile device identifier associated with the mobile device, communicate, using the wireless communications interface, a unique identifier associated with the modular bike lock to the mobile device, lock automatically in response to receiving the locking end within a portion of the locking mechanism without receiving an additional input from the mobile device, and to be mounted on a support structure. The unique identifier may enable the mobile device to unlock the modular bike lock.

The server may be configured to receive an unlock command associated with a locked modular bike lock. The unlock command may include the mobile device identifier and the unique identifier from the mobile device. The server may also be configured to communicate the unlock command to the wireless communications hub. The communication may be directed to the wireless communications hub based on the unique identifier. The wireless communications hub may include a server communications interface in communication with the server that may be configured to receive the unlock command from the server. The wireless communications hub may also include a short range communications interface in communication with the plurality of modular bike locks that may be configured to communicate the unlock command to the modular bike lock associated with the unique identifier. The modular bike lock associated with the unique identifier may be further configured to validate the mobile device identifier and the unique identifier and unlock the modular bike lock in response to successfully validating the mobile device identifier and the unique identifier.

In another aspect, a method for locking a bike to a structure is provided. The method may include providing, by wireless communications interface of a modular bike lock to a mobile device, an indication that the modular bike lock is available to use. The method may also include receiving, using the wireless communications interface, a selection from the mobile device that indicates that a user of the mobile device has selected to use the modular bike lock and communicating, using the wireless communications interface, a unique identifier associated with the modular bike lock to the mobile device. The method may further include receiving a locking end of a securement mechanism of the modular bike lock within a locking mechanism of the modular bike lock and locking the modular bike lock automatically in response to receiving the locking end without receiving an additional input from the mobile device.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Embodiments of the present inventions provide bike commuters the ability to secure their bikes without having to carry a bike lock with them. The bike locks provided herein are compact electromechanical devices that can be mounted to most existing bike racks, as well as other structures. These bike locks include a securement mechanism, such as a curved rod or chain, that can be used to secure the user's bike to the bike rack. To operate the lock, the user can interface with the lock using a wireless communication protocol, such as Wi-Fi, Bluetooth® or near field communication (NFC), and/or other radio frequency (RF) or wireless protocol, via a mobile device. Such access may be gained by searching for or otherwise locating a nearby available bike lock. Searching may include accessing a list of bike locks on a mobile application and/or website that enables a user to control a lock/unlock state of a particular bike lock using a mobile device. The lock itself may be mounted to a bike rate or other feature.

In some embodiments, the bike lock may communicate with mobile devices directly and/or using an intermediate wireless communications hub. In some embodiments, the bike lock may be configured to communicate directly with a mobile device using a short range communications interface, such as Bluetooth®, NFC, and/or other RF source. The bike lock may then be connected with a wireless communications hub, which may connect to a larger network, such as the Internet. Such a configuration allows a user to control lock/unless access of the bike lock remotely using the mobile device. For example, the user may interact with a mobile application and/or website using the mobile device to remotely unlock a particular bike lock. The interaction may result in a command being communicated to a server via the Internet. The server may then communicate the command to the wireless communications hub, which may route the command to the bike lock. The connection between the wireless communications hub and the bike lock may be a short range communication network, such as that used by the bike lock to communicate with the mobile device. Such systems prevent the bike lock from needing to be directly connected to the Internet.

The bike locks described herein may be easily installed on existing bike racks or other structures, with little to no modification of the support structure itself. Additionally, the bike locks do not require a running conduit for power or communication, as such components may be self-contained within the bike lock. While described primarily in conjunction with bike locks, it will be appreciated that other locking mechanisms may utilize similar technology. For example, it is contemplated that such locking mechanisms and methods may be utilized for gym lockers, parking meters, doors, and other examples where a user may want to temporarily reserve and use a particular good or service accessible by the public.

Figure 1:
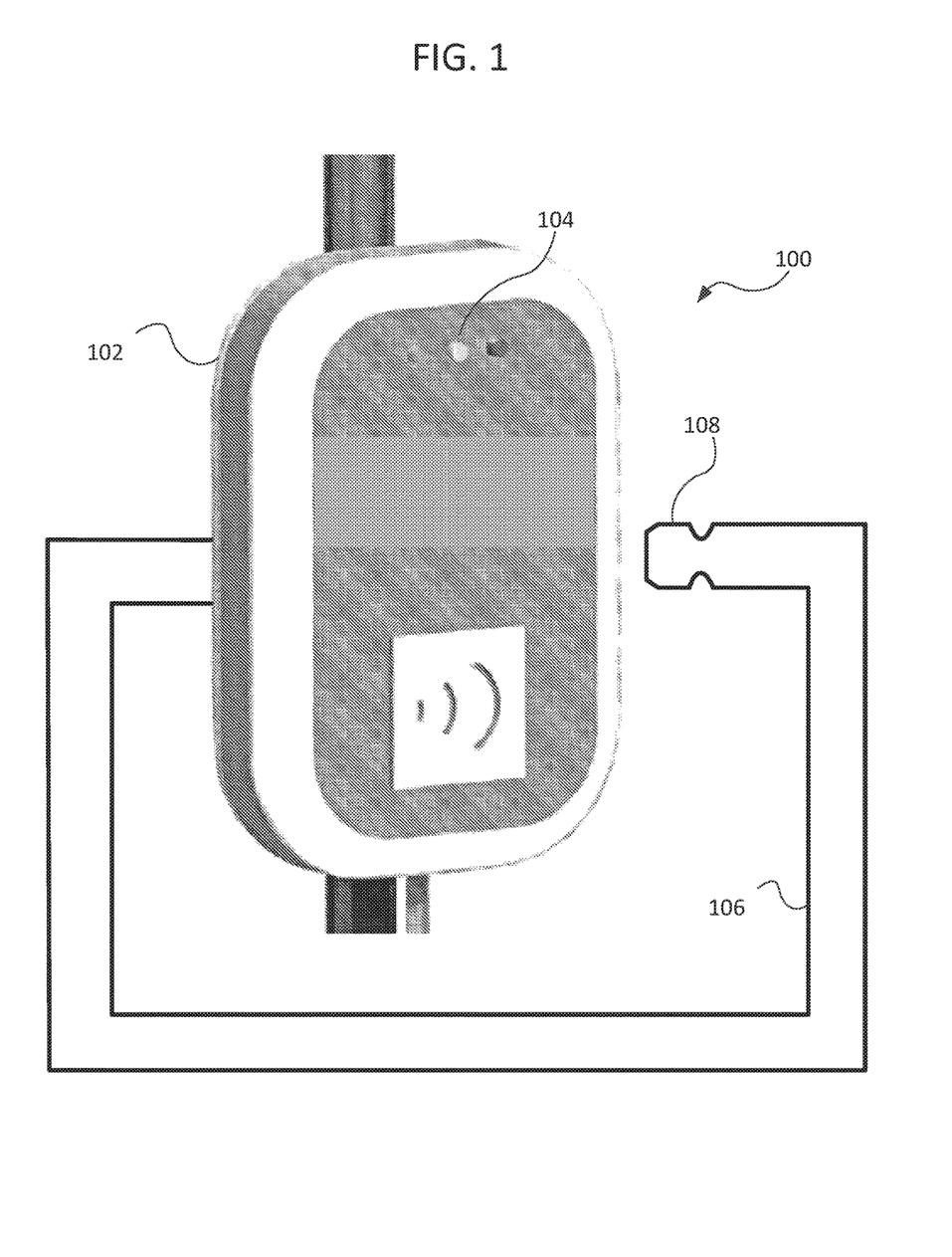
FIG. 1 depicts a bike lock according to embodiments.

Turning now to FIG. 1, one embodiment of a modular bike lock 100 is shown. Bike lock 100 includes a housing 102, which is configured to hold a locking mechanism 112 (shown in FIG. 3) and electric components, such as a wireless communications interface, processor, memory, and lock control mechanism (as shown in FIG. 4). In some embodiments, housing 102 may also include one or more status indicators 104. Status indicators 104 may be configured to provide a locked status of the bike lock 100 and/or to alert a user when a communication, such as a payment attempt, was successfully received by the bike lock 100. Status indicators 104 may include light emitting diodes, speakers, and/or other audio and/or visual indicator of a particular status. As just one example, an LED may be illuminated in red to show that a particular bike lock 100 is currently locked, while an LED (the same or different) may be illuminated in green to show that the bike lock 100 is available for use. It will be appreciated that any indicator device, such as a speaker or display screen may be usable as a status indicator 104.

Bike lock 100 may also include one or more securement mechanisms 106. Securement mechanisms 106 may be chains, rods, and/or other flexible and/or rigid components that may be used to secure a bike to a bike rack or other structure. Securement mechanisms 106 often include metallic components that are resistant to cutting and other forces that may break the securement mechanism 106. At least one end of each securement mechanism 106 may be removably secured within the housing 102. For example, a lock latch 108 or other mating feature may be provided at one end of the securement mechanism 106. The latch 108 may be inserted into a portion of a locking mechanism within the housing to secure the bike lock 100. The latch 108 and locking mechanism may be configured to lock automatically, in a purely mechanical fashion, upon the latch being inserted into the locking mechanism. The latch 108 and locking mechanism may stay in the locked state until an electrical unlock signal is received by the bike lock, causing the locking mechanism to release the latch 108. In this manner, the bike lock 100 may be locked without any interaction with a mobile device, but requires a mobile device to be unlocked, making the bike lock 100 openable only by a person in physical possession of the mobile device.

Figure 2:
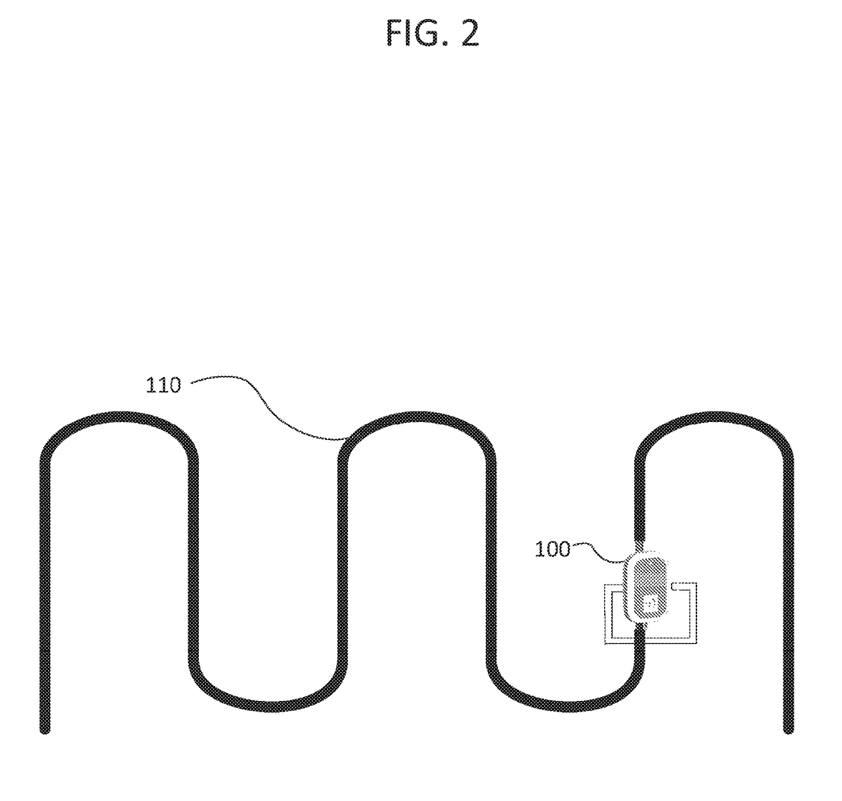
FIG. 2 depicts the bike lock of FIG. 1 secured to a bike rack according to embodiments.

The bike lock 100 may be positioned on any support structure, such as a bike rack 110, as shown in FIG. 2. Bike lock 100 may be secured to bike rack 110 by using fasteners such as bolts or clamps, by welding, may be formed integral with a bike rack 110, and/or secured to the bike rack 110 using other known techniques. Oftentimes, it is desirable to secure bike lock 100 to an existing bike rack 110 without modifying the bike rack 110 itself. In such embodiments, techniques such as lockable clamps are often used. Typically, the bike locks 100 will be secured on the bike racks 110 in such a way that special tools or keys are required to remove the bike lock 100, thus helping to prevent theft.

Figure 3:
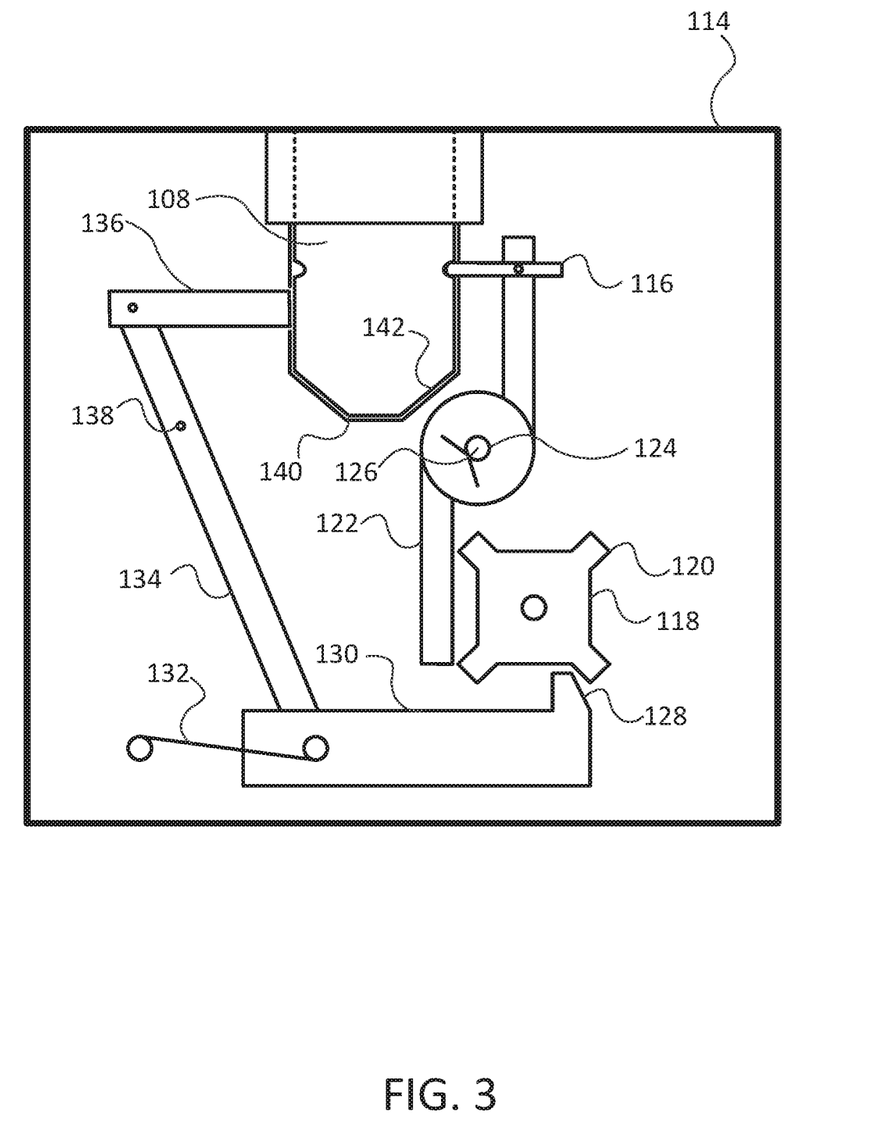
FIG. 3 depicts a locking mechanism of the bike lock of FIG. 1 according to embodiments.
Figure 4:
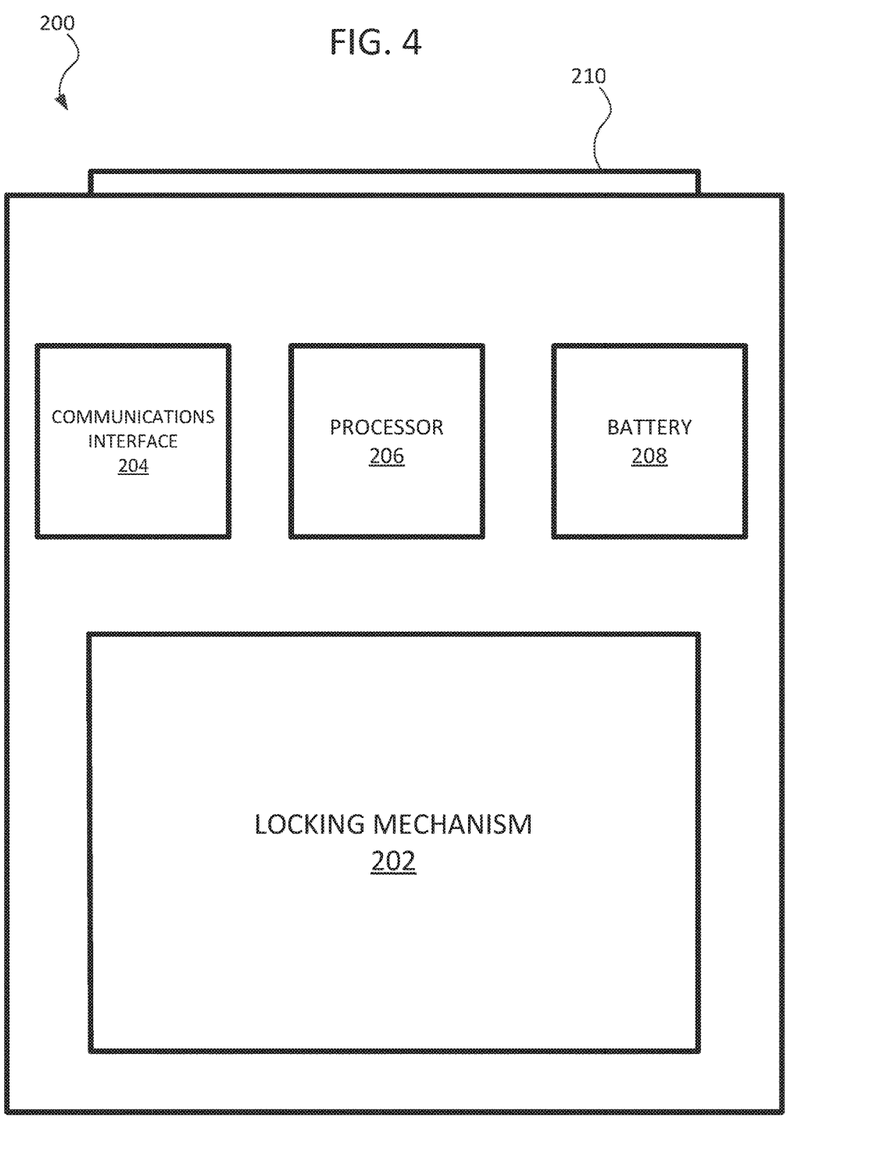
FIG. 4 depicts a system diagram of a bike lock according to embodiments.

FIG. 3 shows one embodiment of a locking mechanism 114 that may be contained in housing 102 of bike lock 100. Locking mechanism 114 may be used to secure a clasp or latch 108 of the securement mechanism 106. For example, latch 108 may be secured within a recess 140 by one or more pins 116. Pins 116 may slide into a recess or notch formed within a side of latch 108 to secure the end of latch 108 within the housing 102 when in a locked state. To unlock the locking mechanism 114, upon receiving an unlock command from a mobile device, a processor or other control mechanism may cause a motor to actuate, causing a cam 118 to rotate. Cam 118 may include a number of arms 120. As cam 118 rotates (in this embodiment clockwise, although other designs may reverse the rotation), a first one of the arms 120 will push against a rotational member 122 that is spring-biased by torsion spring 124. Rotational member 122 may be coupled with pin 116. As rotational member 122 is pushed by the first arm 120, an opposite end of rotational member 122 is pushed away from latch 106 as the rotational member 122 rotates about a pivot point 126. This causes the pin 116 to slide out of the recess in latch 108, releasing the latch 108 and unlocking the bike lock 100. While in the unlocked state, the first arm 120 of cam 118 remains in position forcing the rotation of the rotational member 122 such that the pin 116 remains out of the way of latch 108. While the cam 118 is forcing the rotational member 122 in a direction away from the cam 118, a second one of the arms 120 of cam 118 presses against and depresses an angled portion of extension 128 of an elongated member 130 until second arm 120 rotates beyond the extension 128 and seats along a main body of elongated member 130, with a restraining surface of extension 128 being positioned proximate the second arm 120. Elongated member is coupled with a tension spring 132. Tension spring 132 and elongated member 130 are coupled with a connecting member 134 and a sliding member 136. In some embodiments, connecting member 134 may have a fixed pivot point 138 between the sliding member 136 and elongated member 130. This allows the connecting member to pivot or rotate about pivot point 138. As the latch 108 is removed when unlocked, the tension spring 132 pulls elongated member 130 away from the cam 118, while the connecting member 134 forces sliding member 136 in an opposite direction such that the sliding member 136 enters a portion of the recess 140. The movement of the elongated member 130 causes the restraining surface of extension 128 to pull the second arm 120 of the cam 118 to a reset position, such that the arms 120 of cam 118 are no longer biasing any members of the locking mechanism 114 and allowing rotational member 122 and pin 116 to return to their neutral positions with the pin 116 positioned within the recess 140.

The locking mechanism 114 may be configured to lock automatically, without any input from a mobile device, or any actuation by an electronic source. For example, as a user inserts the latch 108 within the recess 140, angled edges 142 of the latch 108 press against and force both pin 116 and sliding member 136 out of the recess 140. When fully inserted within the recess 140, the notch of latch 108 is aligned with the pin 116 and torsion spring 124 forces the pin 116 to slide into the notch, thereby locking the latch 108 within the locking mechanism 114. As sliding member 136 is forced out of recess 140, the elongated member 130 is forced back toward cam 118, thereby resetting the position of the elongated member 130.

It will be appreciated that the above locking mechanism 114 is merely one example of a self-locking mechanism that is usable with the bike locks 100. Other mechanisms may be used that are unlockable by using a motor or other electromechanical device and that are lockable using purely mechanical interactions. Additionally, some embodiments, may forego the purely mechanical locking mechanism and require an electric signal, such as a lock command from a mobile device, to actuate a motor to drive a locking sequence. Housing 102, as well as other components of the locking mechanism 114 of the bike lock 100 may be formed of synthetic materials such as plastics and/or composites, metals, and/or combinations thereof, although metallic components, such as steel components are often utilized to provide a sturdier design that is more resistant to wear and breakage associated with theft and vandalism attempts. Components may be forged, cast, 3D-printed, and/or otherwise formed, and may be assembled using any combination of mechanical fasteners, mating features, welding, adhesives, and/or other known securement techniques.

FIG. 4 depicts a system diagram of a bike lock 200. Bike lock 200 may have similar features as bike lock 100, and include a similar or identical structure. For example, bike lock 200 may include a locking mechanism 202. Locking mechanism 202 may have a same or different design structure as locking mechanism 114, with the locking mechanism 202 being configured to lock automatically upon receiving a latch and to unlock upon receiving an unlock command from a mobile device. Such communications may be received using a communications interface 204. Communications interface 204 may include one or more short range antennas. For example, communications interface 204 may include a Bluetooth®, NFC, and/or other short range communications antenna. As just one example, a mobile device may provide an unlock command to the bike lock 200 using a Bluetooth® signal received by the communications interface 204. The unlock command may cause a processor 206 or other lock control mechanism to manipulate a motor and/or other electromechanical actuator of the locking mechanism 202. In some embodiments, the unlock command may include an identifier of the mobile device and/or an identifier of the bike lock 200. The processor 206 may validate the identifier(s), and upon successful validation, the processor 206 may cause the actuation of the locking mechanism 202 to unlock the bike lock 200. The components of bike lock 200, including the locking mechanism 202, communications interface 204, and processor 206 may be powered by a self-contained power source, such as batter 208. In some embodiments, the battery 208 may be replaceable and/or rechargeable. For example, the battery 208 may be coupled to a solar cell 210 or other charging mechanism. Solar cell 210 may be positioned on an outer surface of the bike lock 200 that is exposed to sufficient amounts of sunlight to charge the battery 208 and/or power the electronics of bike lock 200. In some embodiments, a charging port may be provided on a housing of bike lock 200 allowing a user to plug a power source into the bike lock 200 to recharge the battery 208. Each of the components of bike lock 200 may be electrically and communicatively coupled via a bus extending between the various components.

Figure 5:
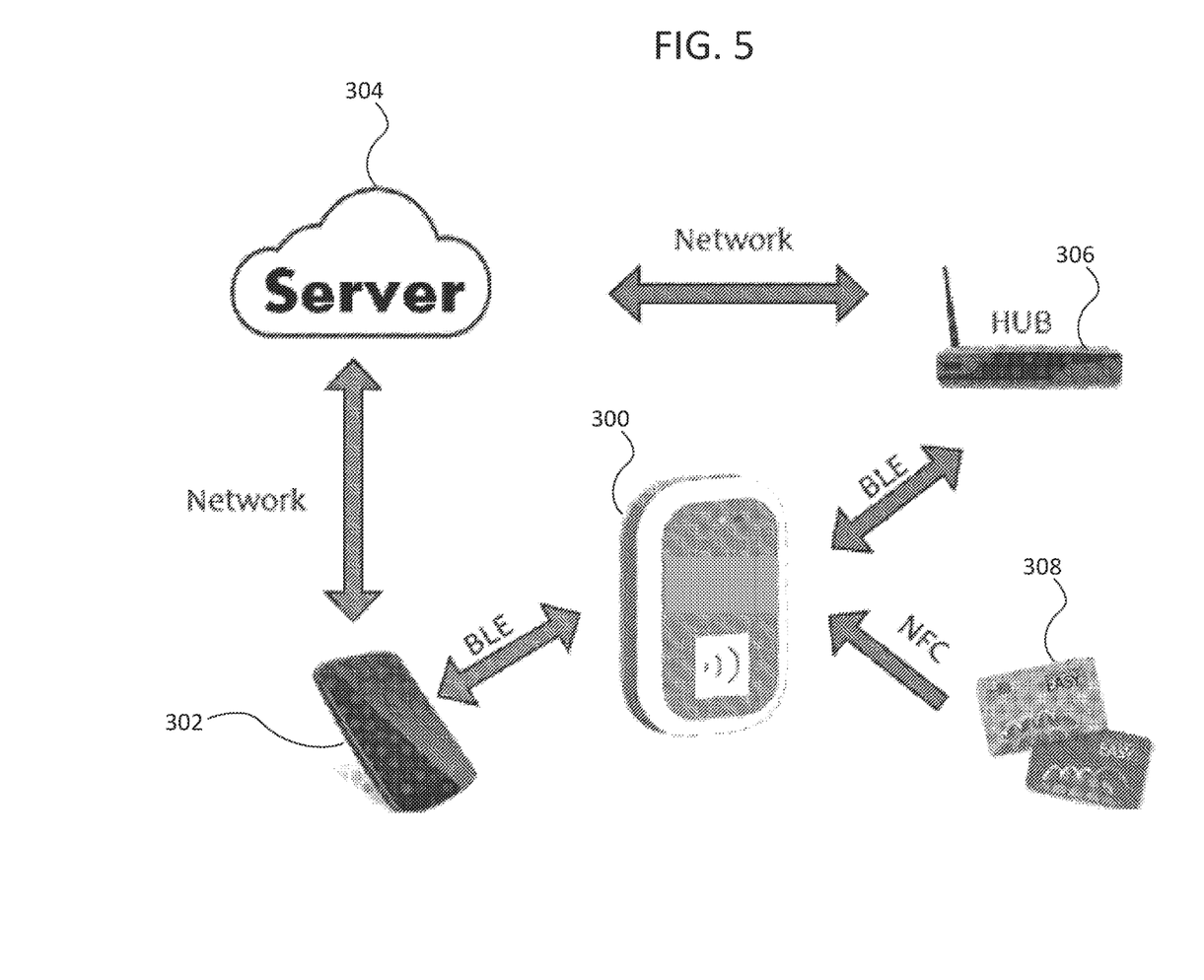
FIG. 5 depicts a system diagram of a system for locking bikes according to embodiments.

FIG. 5 is a system diagram showing the interactions of various components of a system for locking a bike. The system includes at least one bike lock 300. Bike lock 300 may be similar to bike locks 100 and 200 described herein. For example, each bike lock 300 may include a locking mechanism configured to lockably secure a latch or other locking end of a securement mechanism, such as a chain or rod that may be positioned around at least a portion of a bike. For example, a latch may be inserted within a recess of a locking mechanism where it is held in place by one or more locking pins, such as in bike lock 200. Bike lock 300 may also include a wireless communications interface that is configured to enable short range wireless communications with other devices. For example, the wireless communications interface may include one or more antennas configured to transmit and/or receive signals using Bluetooth®, NFC, and/or other short range communications protocols. Bike lock 300 may also include a processor configured to unlock the bike lock 300.

To use the bike lock 300, a user may input a selection of a particular bike lock 300 using a mobile device 302. For example, the user may search for an available bike lock 300 using a website or mobile application, which may provide a list and/or a map of available bike locks 300 in a particular area. In some embodiments, locating a nearby available bike lock 300 may be done by the website and/or mobile application leveraging a Bluetooth® or other wireless antenna of the mobile device 302 to detect bike locks 300 that are within a signal broadcast range of the mobile device 302. In such embodiments, the bike lock 300 may communicate directly with the mobile device 302. For example, a user may open a mobile application on the mobile device 302 and a list is populated with bike locks 300 with Bluetooth® or other signals that are detected by the mobile device 302. In some embodiments, only those bike locks 300 that are available for use may be detected by the mobile device 302, while bike locks 300 that are currently being used to secure bikes are not detected and/or shown to the user on the mobile device 302. In other embodiments, all bike locks 300 may be shown on the mobile device 302, along with a status identifier that indicates whether each bike lock 300 is currently available or already in use.

In other embodiments, a list or map of bike locks 300 may be provided to the user and searching may be done based on global positioning satellite (GPS) data from the mobile device 302. For example, a mobile application and/or website may detect the user's location based on GPS or other location data from the mobile device 302 and compare that to a database of known bike locks 300 to present the user a subset of bike locks 300 that are available for use. In some embodiments, all known bike locks 300 may be shown, with a status identifier indicating which bike locks 300 are currently available for use and/or which bike locks 300 are currently being used to secure a bike. In other embodiments, only those bike locks 300 that are currently available for use may be shown. In some embodiments, this may be done by each bike lock 300 communicating its status to a server 304, which may use this information to update the mobile application and/or website. Oftentimes, the bike lock 300 will only have a short range wireless communications interface and will not be directly connected to the Internet. In such embodiments, a wireless communications hub 306 may be configured to interface with both the bike lock 300 and the server 304. For example, hub 306 may include a short range communications interface in communication with a number of bike locks 300. For example, a short range antenna, such as a Bluetooth® antenna, may be included in hub 306 to communicate with bike lock 300. The wireless communications hub 306 may also include a server communications interface in communication with the server 304, which may be positioned remotely from the hub 306. The server communications interface may include an Internet accessible connection and/or may be privately connected to the server 304, which may itself be connected to the Internet. For example, the server communications interface may include one or more wireless communications media, Ethernet, and/or other public or private communications interface between the server 304 and hub 306. Such setups allow the bike lock 300 to be accessible via the Internet, such as through the mobile application and/or a website. In some embodiments, the bike lock 300 may transmit an indication of the status of the bike lock 300 (e.g., available or in use) to the hub 306, which may forward the indication to the server 304 for updating the lists and/or maps.

interface of his mobile device 302. This selection may be transmitted, using a mobile application or website accessed by the mobile device 302, to the bike lock 300. This may be a direct transmission, such as when the mobile device 302 is within a communication range of a Bluetooth® or other signal of the bike lock 300 and/or an indirect transmission over the Internet, using the server 304 and hub 306 to route the selection to a particular bike lock 300. Such routing may be done by including an identifier of the selected bike lock 300 in the transmission such that the server 304 and hub 306 may use the identifier as a delivery address for the transmission. The bike lock 300 may receive the direct and/or indirect transmission and establish a communication link between the selected bike lock 300 and the mobile device 302.

The bike lock 300 and mobile device 302 may then exchange identification information. For example, the mobile device 302 may send the bike lock 300 an identifier, such as a phone number, serial number, International Mobile Equipment Identity (IMEI), and/or other unique identifier, to the bike lock 300, which may store the mobile device identifier on a memory device of the bike lock 300. Similarly, the bike lock 300 may communicate its own identifier to the mobile device 302, which may store the bike lock identifier on a portion of the mobile device memory that is accessible to the mobile application and/or website. It will be appreciated that while described as an exchange of identifiers, some embodiments may involve only the bike lock 300 or the mobile device 302 to send an identifier. In other embodiments, one or both of the devices may exchange multiple types of identifying information to further secure the lock/unlock process. By exchanging information between both devices, it may be more feasible for a single mobile device 302 to have control of multiple bike locks 300 at a single time, as unlocking would require the identity of a particular lock to be verified as well as the identity of the mobile device 302.

In some embodiments, the selected bike lock 300 may be available for a new user, but still be in the locked state. For example, the previous user may have removed his bike from the bike lock 300 but then re-latched the locking end within the locking mechanism. Upon receiving the selection from the mobile device 302 and/or exchanging identifiers, the bike lock 300 may make a determination whether it is in the locked or unlocked state. If locked, the bike lock 300 may actuate a motor or other mechanism to unlock the latch from the locking mechanism, thus making the bike lock 300 accessible to the new user.

Once the identifiers have been exchanged, the bike lock 300 may be usable by the user of the mobile device 302. An indication of use may be provided via an audio and/or visual indication produced on the mobile device 302 and/or the bike lock 300. For example, a message indicating that the user now has access to the bike lock 300 may be presented on a display of the mobile device 302. In other embodiments, an audible sound and/or a vibration may be produced using a speaker and/or vibration element of a mobile device 300. In yet other embodiments, the bike lock 300 may illuminate a status indicator, such as an LED, or produce an audible sound indication. It will be appreciated that any combination of alerts may be used to indicate to a user that a bike lock is now available for use. The user may then position the securement mechanism of the bike lock 300 around at least a portion of a bike or other object and insert the latch into a locking mechanism, which locks automatically in response to receiving the locking end/latch within a portion of the locking mechanism. Thus, the user is not required to electronically lock the bike lock 300. This helps ensure that users do not forget a final step of interacting with their mobile device 302 before leaving their bike.

While the bike lock 300 is securing a bike or other object, the bike lock 300 may keep the user updated with any changes in a status of the bike lock 300. As one example, the mobile application and/or website may show the user a current status of any bike lock 300 the user is currently controlling and/or has controlled within a predetermined threshold of time. As another example, if the bike lock 300 is unlocked, with and/or without receiving an instruction to unlock from the mobile device 302, the mobile application and/or website may cause an alert to be communicated to the mobile device 302. For example, a push notification, SMS message, email message, automated phone call, and/or other alert may be provided to the mobile device 302 indicating that the bike lock 300 has been unlocked. This alert may help a user detect a theft of the bike remotely and provide the user with the ability to quickly alert authorities while the theft is still in progress. Other alerts may be tied to a certain amount of movement or damage detected by the bike lock 300 that may be indicative of a theft attempt. For example, the bike lock 300 may include an accelerometer, GPS unit, and/or other motion sensor that may detect when the bike lock 300 has been or is moved. If a threshold amount of movement, which could be based on a number of inches, feet, or other length measurement, and/or a value measured by the accelerometer, is detected, an alert may be transmitted to the mobile device causing a textual, other visual form, audio, and/or vibrational alert to be produced on the mobile device 302. In some embodiments, the alert may include a description of the alert event detected. Additional alerts may be provided if the bike lock 300 loses communication with the hub 306. This may be indicative of a power failure (so a user may not be able to remotely unlock the bike lock 300) or of movement of the bike lock 300 outside a signal range of the hub 306.

Unlocking the bike lock 300 may be done in two ways. The user of the mobile device 302 may return to a close proximity with the bike lock 300 such that the mobile device 302 and bike lock 300 may communicate directly over a short range communications network. Once in range, the user may interact with the mobile application and/or website on the mobile device 302 to send an unlock command to the bike lock 300. The unlock command may include one or both of the mobile device identifier and the bike lock identifier. The modular bike lock associated with the bike lock identifier may be further configured to validate the unlock command. This may include comparing the identifiers in the unlock command with the identifier of the bike lock 300 and with the mobile device identifier stored in the memory of bike lock 300. If the identifiers match, the bike lock 300 may send a signal to a motor or other actuator of the locking mechanism and unlock the bike lock 300. In some embodiments, a user may wish to unlock a bike lock 300 remotely. For example, the user may have a friend who wishes to borrow the user's bike, while the user does not wish to go to the location where the bike is secured. In such situations, the user may access the mobile application and/or website using mobile device 302 to communicate a remote unlock command to the bike lock 300. The remote unlock command may be transmitted to the server 304, which may route the unlock command to the hub 306. Hub 306 may then relay the unlock command to the bike lock 300 for validation of identifiers within the unlock command. The identifier of the bike lock 300 may be used by both the server 304 and the hub 306 to route the command to the correct bike lock 300.

Once the bike lock 300 is unlocked, it may be reset for a next user. In some embodiments, this may include deleting the stored mobile device identifier from a memory of the bike lock 300 and/or changing an identifier of the bike lock 300 itself. This may include the server 304 and/or the bike lock 300 generating a new identifier and communicating it to the other. The generation of new identifiers may enable systems where only the bike lock 300 provides an identifier to the mobile device 302 such that validation includes only validating that the mobile device 302 has the proper bike lock identifier. Thus, each transaction or use involves a new identifier so that a user may not reuse or share the identifier to get additional uses of the bike lock 300. Additionally, this prevents thieves from learning the identifier and using it to aid in crimes.

In some embodiments, the bike lock 300 may require payment to be used. Payment may be received in a number of ways. For example, upon selecting a particular bike lock 300, a user may be asked to remit payment for the use The user may provide payment via a payment reader on the bike lock 300 itself, such as an NFC reader, magnetic stripe reader, chip card reader, and/or other payment readers, which may be part of and/or connected to the communications interface of a bike lock 300. The payment information may be read from a payment media 308 by the payment reader of the bike lock 300 and transmitted to server 304 via hub 306, where the payment may be processed, such as by authenticating with a bank or issuing financial institution of the payment media 308. Upon authentication of the payment, the server 304 may communicate an authorization message to the bike lock 300 via the hub 306. The authorization message may instruct the bike lock 300 to continue making itself available to the user of the mobile device. In other embodiments, the user may wish to pay using the mobile application and/or website. In such embodiments, the user may either select funds from an account associated with the mobile application and/or web site or provide funds electronically, such as by entering payment information into the mobile application and/or website. This information may be sent from the mobile device 302 to the server 304, which may process the payment and provide an authorization message to the bike lock.

Figure 6:
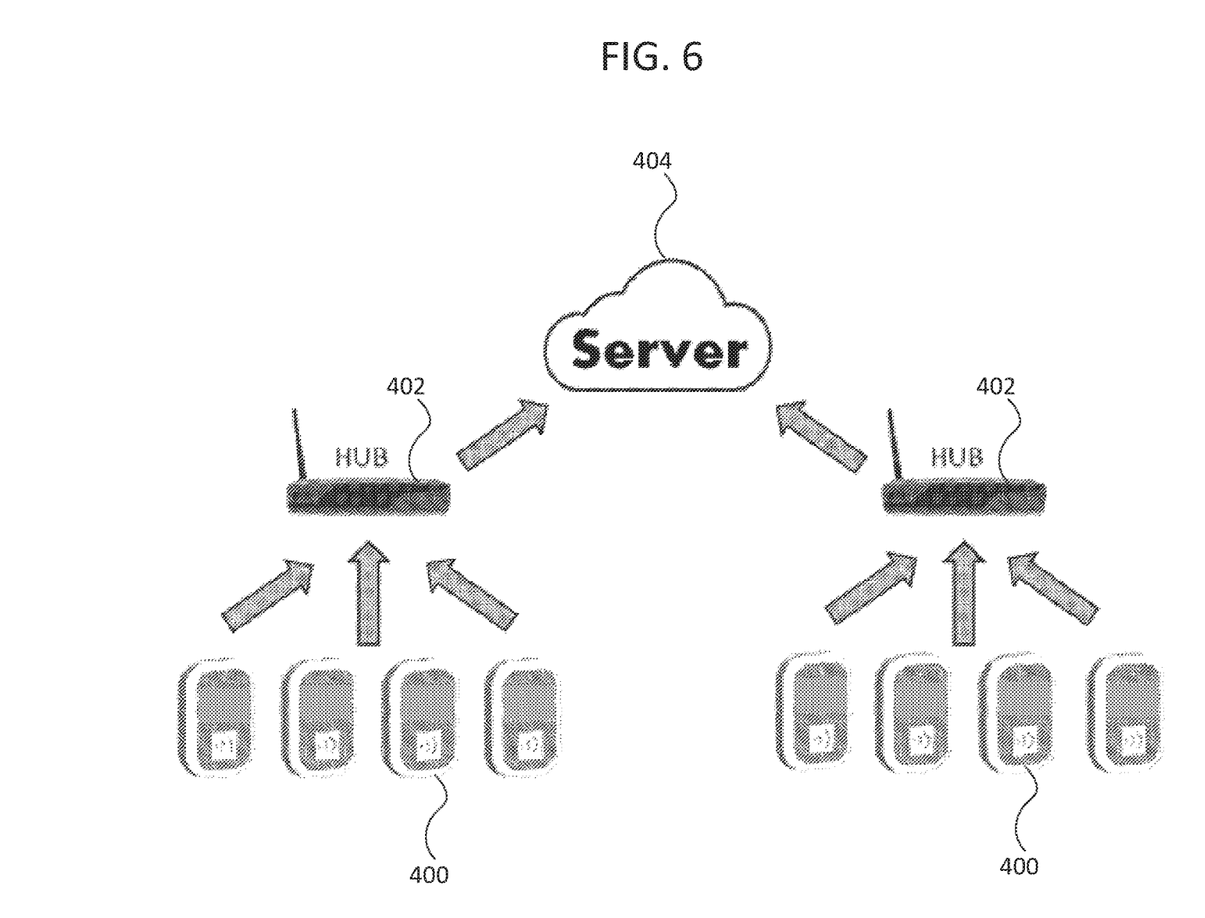
FIG. 6 depicts a bike lock network according to embodiments.

FIG. 6 shows a system for locking bikes, similar to that of FIG. 5. The system includes a number of bike locks 400 that are each communicatively coupled with a hub 402. A number of hubs 402 are provided, and each hub is communicatively coupled to a server 404. The system represents a possible set up of a bike lock network, with one or more servers 404 controlling one or more hubs 402, with each hub 402 communicating with one or more bike locks 400. It will be appreciated that the scale of a network of bike locks 400 may include any number of bike locks 400, hubs 402, and/or servers 404 based on the needs and desires of the operator of the bike lock network. The components of the bike lock network may operate in the same fashion as the system described in relation to FIG. 5. In some embodiments, each hub 402 may be in a back room or within a store or other business where the hub 402 may be provided with power and a connection to the Internet. The hub 402 must then be positioned within a signal range of the bike locks 400.

Figure 7:
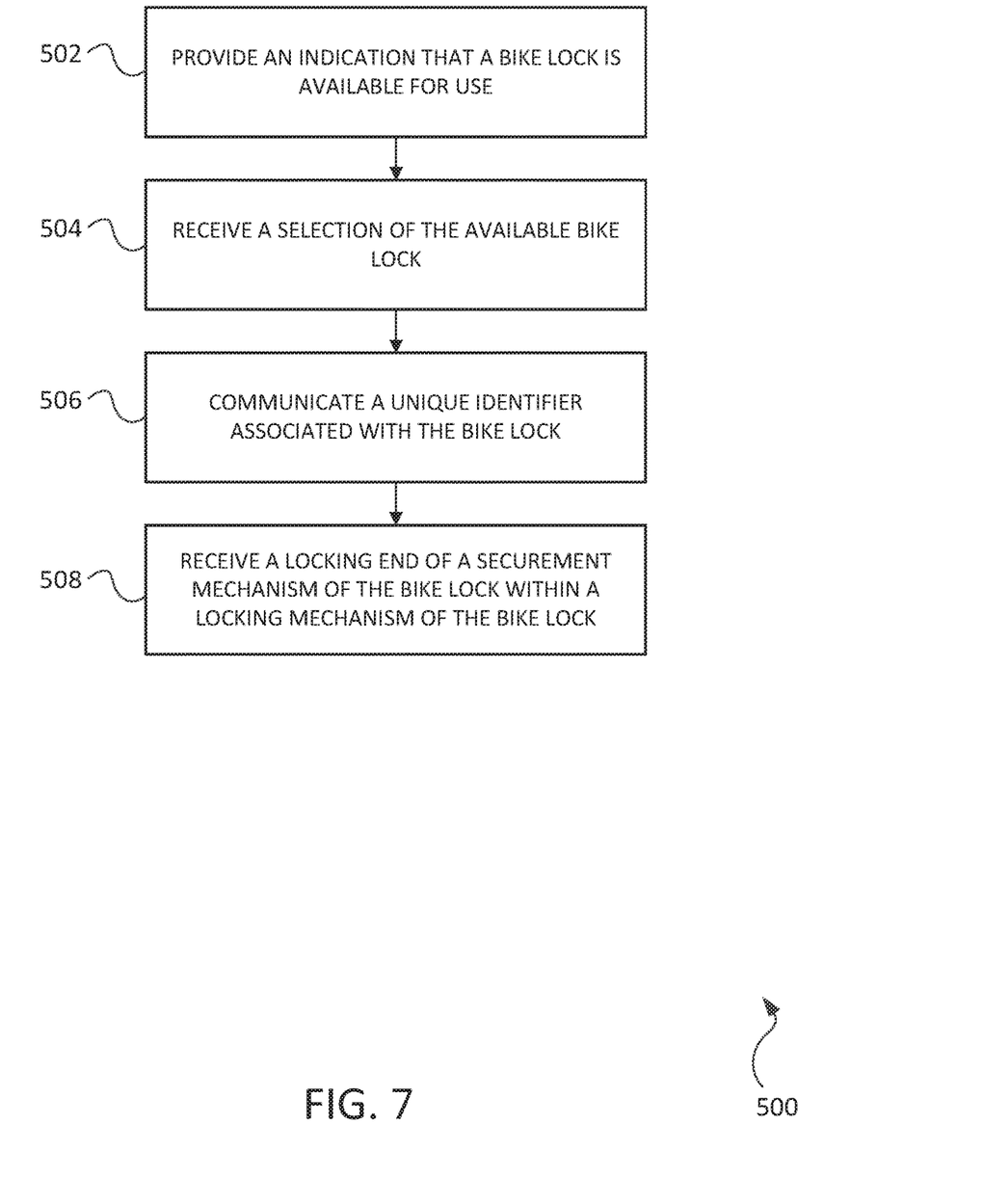
FIG. 7 is a flowchart of a process for locking a bike according to embodiments.

FIG. 7 shows a flowchart of a process 500 for locking a bike to a structure is provided. Process 500 may be performed by any of the bike locks and/or systems described herein. The bike lock may be secured to a support structure, such as a pole, a bike rack, or other fixture. This many involve bolting, clamping, welding, and/or otherwise securing the bike lock to the structure in a manner that is difficult to reverse without proper tools and/or a key. Process 500 may include providing, by wireless communications interface of a modular bike lock to a mobile device, an indication that the modular bike lock is available to use at block 502. This may include the bike lock directly transmitting an indication to a mobile device that is within a signal range of a short range communications antenna, such as a Bluetooth® antenna, of the bike lock. In other embodiments, the indication may be provided by the bike lock to a wireless communications hub that forwards the indication to a server. The server may then use the indication to help populate a list and/or map of available bike locks near the mobile device. At block 504, a selection may be received by the bike lock from the mobile device. The selection may indicates that a user of the mobile device has selected to use the selected modular bike lock. Such a selection may be made by the user of the mobile device, such as by interacting with a user interface of a website and/or mobile application presented on a display of the mobile device. The selection may be received directly from the mobile device using the short range communications antenna of the bike lock and/or indirectly via the server and hub. In some embodiments, the selected bike lock may determine that it is in a locked state and may unlock the bike lock based on this determination, thus allowing the user to access the lock. In some embodiments, the process 500 may also include receiving a payment for use of the bike lock. This payment may be received by a payment reader of the bike lock and/or transmitted electronically to the server by the mobile device. The payment may be received at any time of the process 500, such as before or after selection of a particular lock.

The bike lock may communicate, using the wireless communications interface, a unique identifier associated with the modular bike lock to the mobile device at block 506 This identifier may be stored by the mobile device in a memory location accessible by the mobile application and/or website. In some embodiments, the mobile device may also provide a mobile device identifier to the bike lock, with this identifier being stored in a memory of the bike lock. A locking end and/or latch of a securement mechanism of the modular bike lock may be received within a locking mechanism of the modular bike lock at block 508. For example, a user may position the securement mechanism, such as a chain or rod, around a portion of the user's bike or other object and then insert a latch on one end of the securement mechanism into the locking mechanism. This may cause the bike lock to lock automatically due to the mechanical structure of the bike lock, without receiving an additional input from the mobile device.

While locked and in use, the bike lock may be configured to alert the user of the mobile device of changes in status of the bike lock. For example, if the bike lock is unlocked, moved, damaged, and/or communication with the hub is lost, the bike lock may communicate an alert (likely to the hub and server to be relayed to the mobile device) to the mobile device. Such alerts may include textual, and/or other audio and/or visual alerts indicating that the status of the bike lock has changed. This may include sending an SMS message, push notification, email, automated phone call, and/or other alert to the mobile device, causing the mobile device to produce the audio and/or visual alert when received.

To unlock the bike lock, the bike lock must receive an unlock command from the mobile device. This may include receiving the command directly from the mobile device when the mobile device is in a signal range of the bike lock and/or receiving the command indirectly via the server and hub. Once received, the unlock command causes the bike lock to unlock. The unlock command may include the bike lock identifier and/or the mobile device identifier. The bike lock may validate these identifiers, and upon successful validation, unlock itself.

Figure 8:
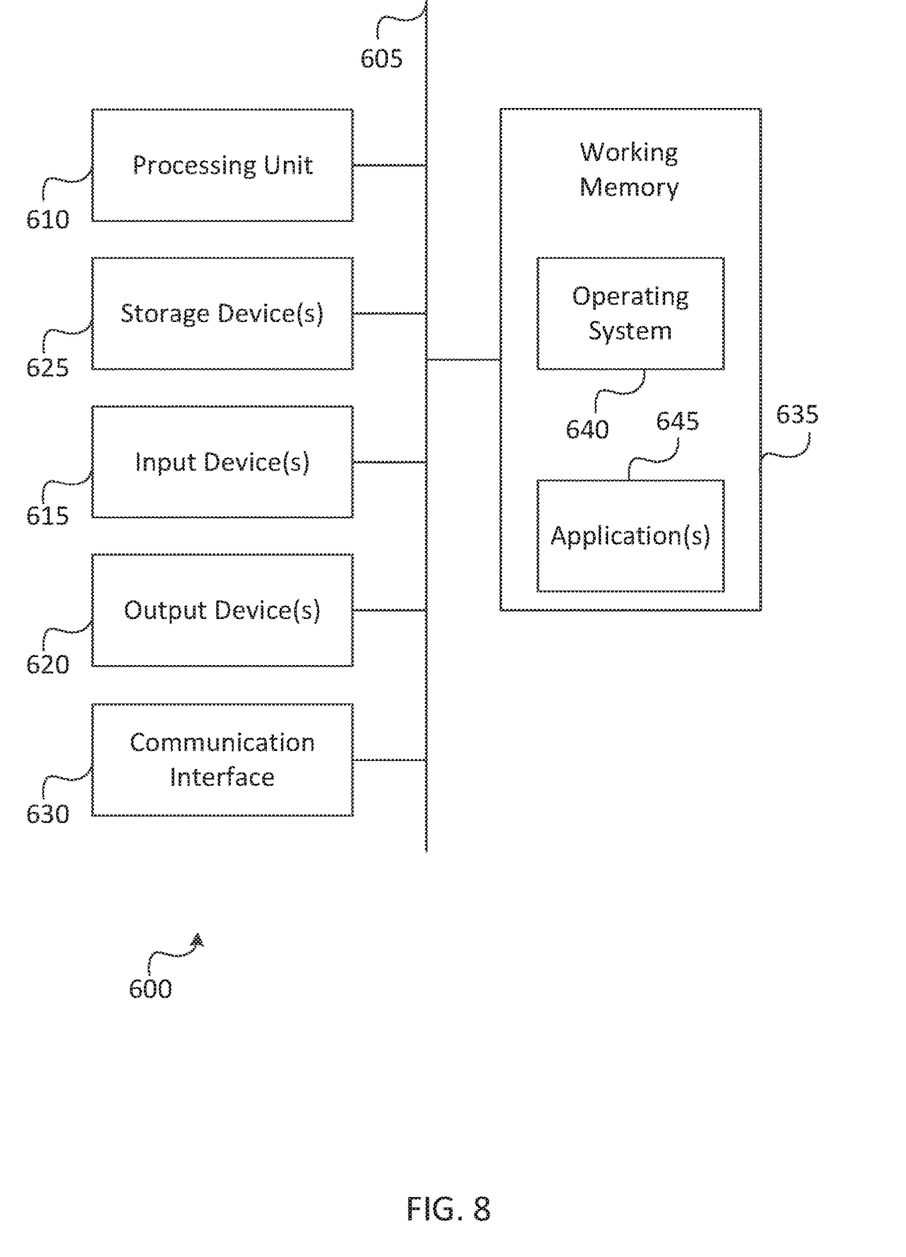
FIG. 8 depicts computer system according to embodiments.

A computer system as illustrated in FIG. 8 may be incorporated as part of the previously described computerized devices. For example, computer system 600 can represent some of the components of the image capture devices, positional sensors, fare access gates and/or central servers described herein. FIG. 8 provides a schematic illustration of one embodiment of a computer system 600 that can perform the methods provided by various other embodiments, as described herein. FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include a processing unit 610, including without limitation one or more general-purpose processors and/or one or more special-purpose processors (such as digital signal processing chips, graphics acceleration processors, and/or the like); one or more input devices 615, which can include without limitation a mouse, a keyboard, a touchscreen, receiver, a motion sensor, a camera, a smartcard reader, a contactless media reader, and/or the like; and one or more output devices 620, which can include without limitation a display device, a speaker, a printer, a writing module, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communication interface 630, which can include without limitation a modem, a network card (wireless or wired), an infrared communication device, a wireless communication device and/or chipset (such as a Bluetooth™ device, an 502.11 device, a Wi-Fi device, a WiMax device, an NFC device, cellular communication facilities, etc.), and/or similar communication interfaces. The communication interface 630 may permit data to be exchanged with a network (such as the network described below, to name one example), other computer systems, and/or any other devices described herein. In many embodiments, the computer system 600 will further comprise a non-transitory working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/ or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 610, applications 645, etc.) Further, connection to other computing devices such as network input/output devices may be employed.

Some embodiments may employ a computer system (such as the computer system 600) to perform methods in accordance with the disclosure. For example, some or all of the procedures of the described methods may be performed by the computer system 600 in response to processing unit 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processing unit 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/ code to processing unit 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communication interface 630 (and/or the media by which the communication interface 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a non-transitory storage device 625 either before or after execution by the processing unit 610.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention.

Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A modular bike lock, comprising:
  a locking mechanism;
  an indicator mechanism configured to provide a status of whether the modular bike lock is in a locked state or an unlocked state;
  a securement mechanism coupled with the locking mechanism, the securement mechanism being configured to wrap around at least a portion of a bicycle, wherein the securement mechanism comprises a locking end configured to engage with the locking mechanism to lock the modular bike lock;
  a wireless communications interface; and
  a processor, the processor being configured to:
    receive, using the wireless communications interface, a selection from a mobile device that indicates that a user of the mobile device has selected to use the modular bike lock; and
    communicate, using the wireless communications interface, a unique identifier associated with the modular bike lock to the mobile device, the unique identifier enabling the mobile device to unlock the modular bike lock;
  wherein:
    the modular bike lock is configured to lock automatically in response to receiving the locking end within a portion of the locking mechanism without receiving an additional input from the mobile device; and
    the modular bike lock is mountable on a support structure.

2. The modular bike lock of claim 1, wherein:
  the wireless communications interface comprises one or more of a Wi-Fi interface, a Bluetooth interface, or a near field communication (NFC) interface.

3. The modular bike lock of claim 1, further comprising:
  a self-contained power source configured to provide power each component of the modular bike lock.

4. The modular bike lock of claim 1, wherein the processor is further configured to:
  receive, prior to locking the modular bike lock, a mobile device identifier associated with the mobile device;
  receive, after the modular bike lock is locked, the mobile device identifier and the unique identifier from the mobile device;
  validate the mobile device identifier and the unique identifier; and
  unlock the modular bike lock in response to successfully validating the mobile device identifier and the unique identifier.

5. The modular bike lock of claim 4, wherein the processor is further configured to perform, upon unlocking the modular bike lock, one or both of:
  deleting the mobile device identifier from a memory of the modular bike lock; or
  generating a new unique identifier associated with the modular bike lock.

6. The modular bike lock of claim 1, wherein the processor is further configured to:
  receive, after the modular bike lock is locked, the unique identifier from the mobile device;
  validating the unique identifier; and
  unlocking the modular bike lock in response to successfully validating the mobile device identifier and the unique identifier.

7. The modular bike lock of claim 6, wherein the processor is further configured to:
  upon unlocking the modular bike lock, generate a new unique identifier associated with the modular bike lock.

8. A system for locking bikes, the system comprising:
  a server;
  a wireless communications hub; and
  a plurality of modular bike locks, each comprising:
    a locking mechanism;
    a securement mechanism coupled with the locking mechanism, the securement mechanism being configured to wrap around at least a portion of a bicycle, wherein the securement mechanism comprises a locking end configured to engage with the locking mechanism to lock the modular bike lock;
    a wireless communications interface; and
    a processor, wherein each modular bike lock is configured to:
      receive, using the wireless communications interface, a selection from a mobile device that indicates that a user of the mobile device has selected to use the modular bike lock;
      receive, using the wireless communications interface, a mobile device identifier associated with the mobile device;
      communicate, using the wireless communications interface, a unique identifier associated with the modular bike lock to the mobile device, the unique identifier enabling the mobile device to unlock the modular bike lock;
      lock automatically in response to receiving the locking end within a portion of the locking mechanism without receiving an additional input from the mobile device; and
      be mounted on a support structure
    the server is configured to:
      receive an unlock command associated with a locked modular bike lock, the unlock command comprising the mobile device identifier and the unique identifier from the mobile device; and
      communicate the unlock command to the wireless communications hub, the communication being directed to the wireless communications hub based on the unique identifier;
    the wireless communications hub comprises:
      a server communications interface in communication with the server, the server communications interface being configured to receive the unlock command from the server; and
      a short range communications interface in communication with the plurality of modular bike locks, the short range communications interface being configured to communicate the unlock command to the modular bike lock associated with the unique identifier;

the modular bike lock associated with the unique identifier is further configured to:
- validate the mobile device identifier and the unique identifier; and
- unlock the modular bike lock in response to successfully validating the mobile device identifier and the unique identifier.

9. The system for locking bikes of claim 8, wherein:
the unlock command is received by the server via a mobile application executed on the mobile device or from a website accessed by the mobile device.

10. The system for locking bikes of claim 8, wherein server is further configured to:
process a payment received upon selection of the modular bike lock.

11. The system for locking bikes of claim 10, wherein:
the payment is received at the modular bike lock and forwarded to the server using the short range communications interface and server communications interface of the wireless communications hub.

12. The system for locking bikes of claim 11, wherein:
the payment is received using an NFC interface of the modular bike lock.

13. A method for locking a bike to a structure, the method comprising:
- providing, by wireless communications interface of a modular bike lock to a mobile device, an indication that the modular bike lock is available to use;
- receiving, using the wireless communications interface, a selection from the mobile device that indicates that a user of the mobile device has selected to use the modular bike lock;
- communicating, using the wireless communications interface, a unique identifier associated with the modular bike lock to the mobile device;
- receiving a locking end of a securement mechanism of the modular bike lock within a locking mechanism of the modular bike lock;
- locking the modular bike lock automatically in response to receiving the locking end without receiving an additional input from the mobile device;
- receiving an unlock command from the mobile device;
- unlocking the modular bike lock in response to the unlock command; and
- upon unlocking the modular bike lock, generating a new unique identifier associated with the modular bike lock.

14. The method for locking a bike to a structure of claim 13, further comprising:
- receiving, prior to locking the modular bike lock, a mobile device identifier associated with the mobile device;
- receiving, after locking the modular bike lock, the mobile device identifier and the unique identifier from the mobile device;
- validating the mobile device identifier and the unique identifier;
- unlocking the modular bike lock in response to successfully validating the mobile device identifier and the unique identifier.

15. The method for locking a bike to a structure of claim 13, further comprising:
- upon receiving the selection, determining that the modular bike lock is in a locked state; and
- unlocking the modular bike lock in response to the determination.

16. The method for locking a bike to a structure of claim 13, further comprising:
securing the modular bike lock to a support structure.

17. The method for locking a bike to a structure of claim 13, further comprising:
sending an alert to the mobile device upon a change in state of the modular bike between an unlocked state and a locked state.

18. The method for locking a bike to a structure of claim 14, wherein:
the unlock command is received by the modular bike lock via a wireless communications hub.

* * * * *

UNITED STATES PATENT AND TRADEMARK OFFICE
CERTIFICATE OF CORRECTION

PATENT NO.       : 9,830,759 B2
APPLICATION NO.  : 15/257391
DATED            : June 13, 2017
INVENTOR(S)      : Tony Maryfield et al.

Page 1 of 1

It is certified that error appears in the above-identified patent and that said Letters Patent is hereby corrected as shown below:

On the Title Page

Item (73) under Assignee section: Change "Cubic Corporation San Diego" to "Cubic Corporation"

In the Claims

Column 18, Line 36, Claim 18: Change "The method for locking a bike to a structure of claim 14" to "The method for locking a bike to a structure of claim 13"

Signed and Sealed this
Thirteenth Day of March, 2018

Andrei Iancu
*Director of the United States Patent and Trademark Office*